C. H. PUTNAM.
LOADING AND UNLOADING DEVICE FOR BAKING OVENS.
APPLICATION FILED APR. 19, 1916.
1,287,430.
Patented Dec. 10, 1918.
2 SHEETS—SHEET 2.
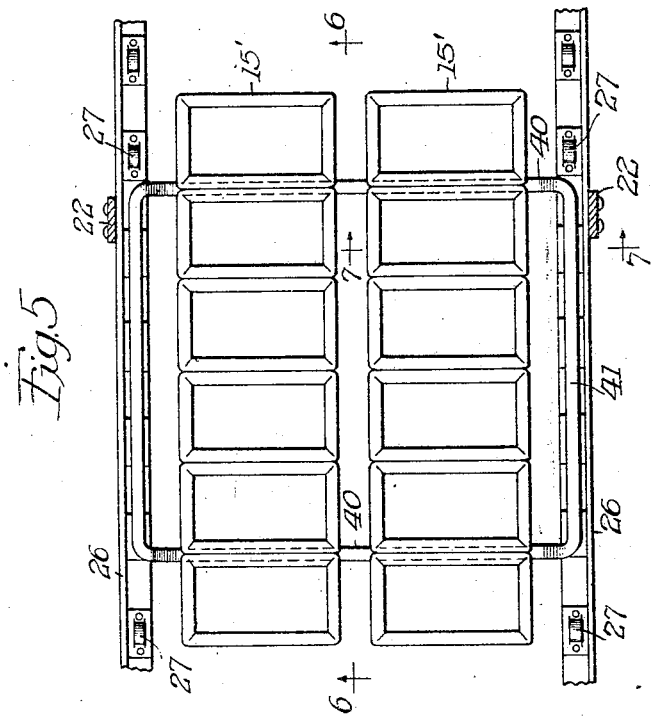
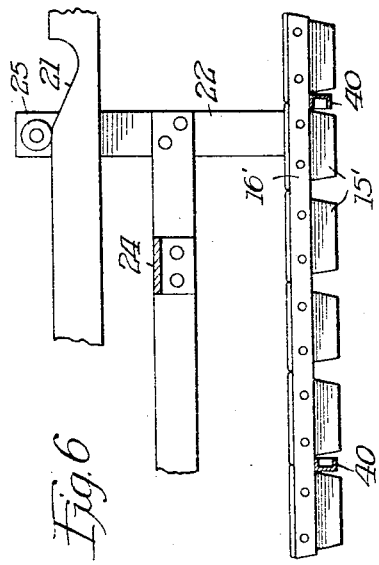
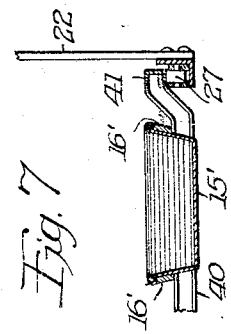
Inventor
Charles H. Putnam
By Pond & Wilson
Attys

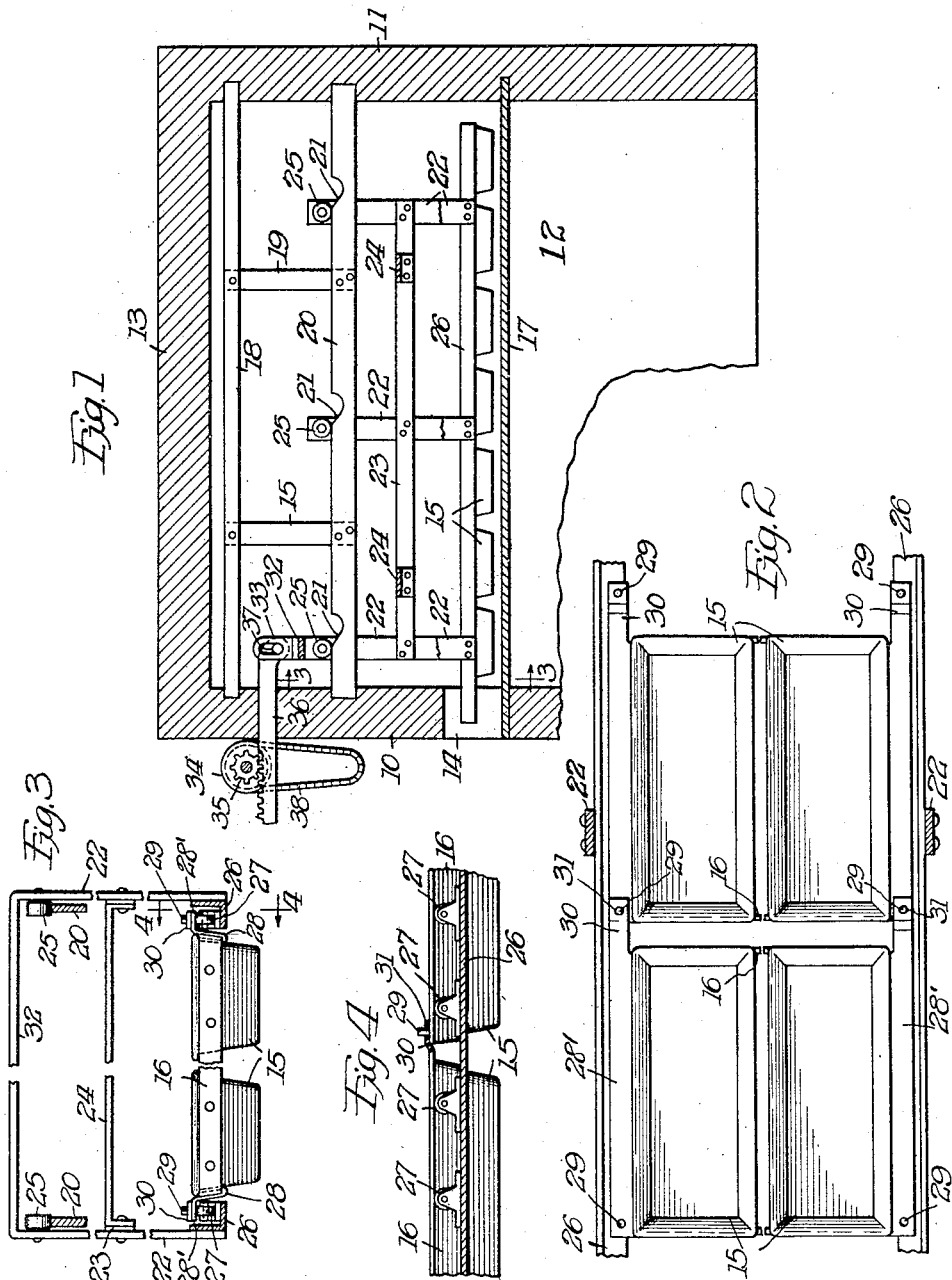

UNITED STATES PATENT OFFICE.

CHARLES H. PUTNAM, OF EVANSTON, ILLINOIS.

LOADING AND UNLOADING DEVICE FOR BAKING-OVENS.

1,287,430.  Specification of Letters Patent.  Patented Dec. 10, 1918.

Application filed April 19, 1916. Serial No. 92,105.

*To all whom it may concern:*

Be it known that I, CHARLES H. PUTNAM, a citizen of the United States, residing at Evanston, in the county of Cook and State of Illinois, have invented certain new and useful Improvements in Loading and Unloading Devices for Baking-Ovens, of which the following is a specification.

This invention relates to appliances for use on baking ovens to facilitate the loading of the oven with material to be baked and the subsequent withdrawal of the baked product. The invention relates, more specifically, to that type of oven-loading and unloading devices wherein a pan or group of pans are introduced to the oven in a position above the baking floor, are then lowered onto the baking floor, and, when the baking is completed, are raised to their former position and then withdrawn. The principal object of the present invention is to provide a novel and improved mechanism for supporting a group of pans in the oven and for lowering and raising the latter relatively to the floor of the oven prior to and after baking.

Another object of the invention is to provide an oven-loader and unloader having the principle of operation above specified which will not require the use of an external conveyer to effect the introduction and withdrawal of the pans, which external conveyer, or external portion of a conveyer, usually occupies considerable room in front of the oven and for that and other reasons is objectionable.

Other minor objects and attendant advantages of the invention will be readily apparent to those skilled in the art from a consideration of the following description taken in connection with the accompanying drawings wherein I have illustrated two practicable forms or embodiments of the invention, and in which—

Figure 1 is a vertical section from front to rear of the baking chamber of an oven showing my improved loading and unloading mechanism partly in side elevation and partly in vertical section;

Fig. 2 is a top plan fragmentary view of the pan-supporting trackway and a group of pans thereon;

Fig. 3 is a cross sectional view taken on the line 3—3 of Fig. 1;

Fig. 4 is an enlarged sectional detail on the line 4—4 of Fig. 3;

Fig. 5 is a plan view corresponding to Fig. 2 and illustrating another form of the invention designed to facilitate the introduction and removal of the connected groups of pans in a direction at right angles to that shown in Figs. 1 to 4 inclusive;

Fig. 6 is an enlarged fragmentary view in cross section on the line 6—6 of Fig. 5;

Fig. 7 is a sectional detail on the line 7—7 of Fig. 5.

Referring first to Figs. 1 to 4 inclusive, 10 designates the front wall, 11 the back wall, 12 the side walls, and 13 the top wall of a bread baking oven of ordinary or usual construction. In the front wall 10 is formed an opening 14 through which the dough is admitted and the baked loaves withdrawn. 15 designates each of a group or series of baking pans, the pans of each series (herein shown as two in number) being rigidly connected at their ends by straps 16. The pans, during the baking operation, rest upon the floor 17 of the oven. Referring now to the pan-supporting, lowering, and raising mechanism, from rods 18 mounted in the upper portion of the baking chamber are suspended by hangers 19 a pair of track rails 20. In the upper edge of each track rail 20 are formed notches having inclined sides 21. Suspended from and adapted to have a limited travel on the rails 20 is a trolley frame comprising vertical bars 22, longitudinal connecting bars 23, and transverse connecting bars 24. On the upper ends of the upright frame bars 22 are trolley wheels 25 riding on the rails 20. To the lower ends of the vertical bars 22 are rigidly connected a pair of inwardly facing angle bars 26 that form a support and trackway for the pans in the manner hereinafter described. On the angle bars 26 are preferably mounted at short intervals a series of anti-friction rollers 27. 28 designates each of a series of detachable pan extension members, the depending portions of which hook beneath extensions of the straps 16 which extend lengthwise of the pans, while the upper horizontal portions 28' form in effect lateral flanges that overlie and ride upon the rollers 27. Each extension member, or the portion 28' thereof that rides on the rollers is provided at one end with an upstanding pin 29 and at its opposite end with a projecting lug 30 having a hole 31 adapted to fit over the pin of an endwise adjacent member to couple groups of pans together.

The upright frame bars 22 nearest the front wall of the oven are united at their upper end by a cross bar 32 on which is secured a vertically slotted bracket or clevis 33. The trolley frame is manually actuated by a simple hand operated device comprising a sprocket wheel 34 journaled in suitable supporting brackets on the front wall of the oven, a pinion 35 fast with the sprocket wheel 34, a rack-bar 36 slidably mounted in and through the front wall of the oven and having on its inner end a cross pin 37 engaging the slotted bracket or clevis 33, and a hand chain 38 depending from the sprocket 34.

In loading the oven, a group 15 of pans containing the dough, with the lateral extension members 28 applied thereto, is entered through the front opening 14 onto the rollers 27 of the trackway 26, and pushed inwardly to a point within or just inside the front opening. A second group of pans is then coupled on by the holes 31 engaging the pin 29, and the two series are similarly pushed inwardly. Additional groups, to the extent that the depth of the oven will permit, are similarly coupled on and pushed into the oven. When the entire batch is in the oven, the chain 38 is manipulated to advance the trolley frame over the tracks 20, by which the trolley wheels 25 ride down the inclined sides 21 of the notches, bringing the pans to rest on the floor 17 of the oven. When the bread is baked, the trolley chain is manipulated in the opposite direction thereby raising the trolley frame and the pans carried thereby, whereupon the several groups of pans may be pulled out, being successively detached and removed as they emerge from the oven.

In the embodiment of the invention illustrated in Figs. 5 to 7 inclusive, I have shown a practical means for handling the groups of pans where it may be desired to enter lengthwise one or more connected groups too long to be entered and withdrawn sidewise after the fashion shown in Figs. 1 to 4. In this instance the trolley track and trolley frame is identical with that previously described, but the relatively long groups or series 15′ of pans are supported upon a rectangular frame structure, the transverse members 40 of which extend between two adjacent pans at the ends of the group and support the pans through engagement with the bonding strips 16′ of the latter, as clearly shown in Fig. 6, while the longitudinal members 41 of the frame which are upwardly offset as shown in Fig. 7 ride upon the rollers 27 of the trackway. The supporting frame member 40, 41 in this embodiment of the invention is analogous functionally to the extension members 28 of the form previously described. To load the oven the rectangular frame member is drawn to or partially through the front opening, the loaded pans are placed thereon, and the whole is then pushed inwardly, then lowered, subsequently raised after the baking is completed, and drawn forwardly to a position wherein the pans may be readily lifted from the frame and withdrawn.

From the foregoing it will be seen that my invention dispenses with the long cumbersome conveyer mechanism heretofore generally employed in oven-loaders of this type, this conveyer mechanism extending for some distance in front of the oven and in some instances being carried through and beyond the rear wall of the oven. According to my invention the mechanism which lowers and raises the pans and facilitates their introduction and withdrawal by providing an anti-friction trackway on which they may be readily slid is all contained within the baking chamber, and consequently, requires no additional space in the baking room itself.

Manifestly the embodiments of the invention illustrated may be varied and modified in minor details within the principle and purview of the invention; as, for instance, it is obviously immaterial whether the anti-friction rollers are on the trackways or on the pan-supporting members which travel on said trackways. Hence, the invention is not limited to the particular details illustrated and described but includes such modifications as are fairly within the terms and spirit of the appended claims:

I claim:

1. A loading and unloading appliance for baking ovens, comprising a vertically movable frame suspended within the baking chamber, and carrying a pair of parallel rails at its lower end forming a trackway, anti-friction rollers mounted at spaced intervals on said rails, pan-supporting members adapted to travel on said rollers, and means for raising and lowering said frame.

2. A loading and unloading appliance for baking ovens, comprising a pair of rails within the baking chamber having horizontal and inclined track portions, a suspended trolley frame having wheels engaging said rails and also having a pair of parallel rails at its lower end forming a trackway, pan-supporting means adapted to travel over said trackway, and operating means for said trolley frame extending through a wall of the oven and operable from outside the latter.

CHARLES H. PUTNAM.